United States Patent
Markovich et al.

(10) Patent No.: US 8,069,482 B2
(45) Date of Patent: Nov. 29, 2011

(54) DEVICE, SYSTEM AND METHOD OF DATABASE SECURITY

(75) Inventors: Slavik Markovich, Kiryat Haim (IL); Nathan Shuchami, Zofit (IL)

(73) Assignee: Sentrigo Inc., Santa Clara, CA (US)

( * ) Notice: Subject to any disclaimer, the term of this patent is extended or adjusted under 35 U.S.C. 154(b) by 0 days.

(21) Appl. No.: 11/711,062

(22) Filed: Feb. 27, 2007

(65) Prior Publication Data

US 2007/0204342 A1 Aug. 30, 2007

Related U.S. Application Data

(60) Provisional application No. 60/776,661, filed on Feb. 27, 2006.

(51) Int. Cl.
*G06F 21/00* (2006.01)
(52) U.S. Cl. .......................................... 726/22; 707/607
(58) Field of Classification Search .................... 726/22, 726/23
See application file for complete search history.

(56) References Cited

U.S. PATENT DOCUMENTS

| | | | |
|---|---|---|---|
| 5,369,702 A | 11/1994 | Shanton | |
| 5,606,610 A | 2/1997 | Johansson | |
| 5,734,896 A * | 3/1998 | Rizvi et al. | 707/202 |
| 6,038,563 A | 3/2000 | Bapat et al. | |
| 6,240,416 B1 | 5/2001 | Immon et al. | |
| 6,279,113 B1 | 8/2001 | Vaidya | |
| 6,292,895 B1 | 9/2001 | Baltzley | |
| 6,292,899 B1 | 9/2001 | McBride | |
| 6,363,489 B1 | 3/2002 | Comay et al. | |
| 6,405,318 B1 | 6/2002 | Rowland | |
| 6,647,400 B1 | 11/2003 | Moran | |
| 6,826,697 B1 | 11/2004 | Moran | |
| 7,058,976 B1 * | 6/2006 | Dark | 726/23 |
| 7,085,780 B2 | 8/2006 | Sakamoto et al. | |
| 7,356,545 B2 * | 4/2008 | Muralidharan et al. | 707/103 Y |
| 2003/0101355 A1 * | 5/2003 | Mattsson | 713/200 |
| 2003/0154399 A1 * | 8/2003 | Zuk et al. | 713/201 |
| 2005/0203921 A1 | 9/2005 | Newman et al. | |
| 2005/0289187 A1 * | 12/2005 | Wong et al. | 707/200 |
| 2006/0149738 A1 * | 7/2006 | Muralidharan et al. | 707/9 |

OTHER PUBLICATIONS

Oracle, Oracle Database Concepts—Chapter 8 Memory Architecture, 1993, Oracle, Part No. B14220-02, http://dowload.oracle.com/docs/cd/B19306_01/server.102/b14220/memory.htm.*
Application Security, Inc. Showcases AppRadar 3.1 Database Activity Monitoring Capabilities at Infosecurity NY, New York, Oct. 25, 2006, downloaded from www.appsecinc.com.
AppRadar Advanced Documentation, Frequently Asked Questions (FAQ), Mar. 29, 2006, downloaded from www.appsecinc.com.
Review of AppRadarTM , downloaded from www.sqlservrcentral.com/columnists/dcorey/reviewappradar_prin . . . dated Sep. 23, 2004.
AppRadarTM Data Sheet, downloaded form www.appsecinc.com dated Jun. 2006.

* cited by examiner

*Primary Examiner* — Gilberto Barron, Jr.
*Assistant Examiner* — Virginia T Ho
(74) *Attorney, Agent, or Firm* — Shiloh et al.

(57) ABSTRACT

Some demonstrative embodiments of the invention relate to a method, device and system of database security. One demonstrative embodiment of the invention includes an intrusion detection sensor to scan transactions on a database, and generate an event based on a detection profile. Other embodiments are described and claimed.

30 Claims, 4 Drawing Sheets

FIG.4

DEVICE, SYSTEM AND METHOD OF DATABASE SECURITY

CROSS REFERENCE TO RELATED APPLICATIONS

This application claims the benefit of U.S. Provisional Application No. 60/776,661, filed Feb. 27, 2006, the entire disclosure of which is incorporated herein by reference.

BACKGROUND

Databases are usually implemented for maintaining large amounts of the data, including sensitive and/or secret data. Accordingly, the databases may be the target of inside as well as outside attacks.

Network perimeter defense systems, e.g., firewall systems, and/or network Intrusion Detection Systems (IDSs) may be implemented to actively prevent intrusions to a network, for example, by blocking malicious traffic before it is allowed past a perimeter of the network.

However, although the network perimeter defense systems may be efficiently implemented for defending the network from outside attacks, such network perimeter systems may not be adapted to defend the databases against, for example, employees having valid accounts and passwords, Trojan horses, malicious data manipulation, accidental data manipulation, and/or any other attacks as known to one of ordinary skill in the art.

US Patent Application Publication 2005/0203921 to Newman et al. published Sep. 15, 2005 ("the '921 publication") describes a security solution designed to monitor and detect malicious activity against a database. The '921 publication describes an agent, which is installed on a database application for which it is to monitor and protect. The '921 publication describes the agent analyzes received events and detects/prevents any malicious activity. All malicious activity is recorded, processed and forwarded to a console.

SUMMARY

Some demonstrative embodiments of the invention relate to a method, device and system of database security.

Some demonstrative embodiments of the invention include an intrusion detection sensor able to scan transactions on a database, and generate an event based on a detection profile. The sensor may be able to directly access the database, for example, via a direct memory attachment.

According to some demonstrative embodiments of the invention, the sensor may have an intrusion-detection-efficiency (IDE) of at least six, for example, when a rate of the transactions is at least ten transactions per second.

According to some demonstrative embodiments of the invention, the IDE may include, for example, a ratio between an intrusion-detection-success-rate (IDSR) of the sensor and a processor utilization by the sensor.

According to some demonstrative embodiments of the invention, the IDSR may relate, for example, to a test profile defining an event is to be generated in response to each of a plurality of select operations performed on the database. The IDSR may include, for example, a ratio between a number of events generated by the sensor when the detection profile comprises the test profile, and a number of the plurality of select operations.

According to some demonstrative embodiments of the invention, the IDSR of the sensor may be at least ninety percent. In one example, the IDSR of the sensor may be at least ninety five percent. In another example, the IDSR of the sensor may be substantially one hundred percent.

According to some demonstrative embodiments of the invention, the processor utilization of the sensor may be fifteen percent or less. In one example, the processor utilization may be ten percent or less. In another example, the processor utilization may be five percent or less.

According to some demonstrative embodiments of the invention, the IDE of the sensor may be at least eight. For example, the IDE of the sensor may be at least ten.

According to some demonstrative embodiments of the invention, the rate of the transactions may be at least fifty transactions per second. In one example, the late of the transactions may be at least one hundred transactions per second. In another example, the rate of the transactions may be at least five hundred transactions per second.

According to some demonstrative embodiments of the invention, the detection profile may include one or more predefined detection rules relating to the transactions.

Some demonstrative embodiments of the invention include a database system. The database system may include a database host, which may include, for example, an intrusion detection sensor able to access a database. The database system may also include, for example, a server to provide the intrusion detection sensor with a detection profile. The sensor may scan transactions over the database, and generate an event based on the detection profile. An IDE of the sensor may be, for example, at least six when, for example, a rate of the transactions is at least ten transactions per second Some demonstrative embodiments of the invention include a method of securing a database. The method may include, detecting intrusions to the database at an IDE of at least six, for example, when a rate of transactions on the database is at least ten transactions per second. The detecting may include, for example, scanning the transactions, and generating an event based on a detection profile.

Some demonstrative embodiments of the invention include a machine-readable medium having stored thereon instructions, which when executed by a machine result in an intrusion detection sensor to scan transactions on a database, and generate an event based on a detection profile. The instructions may result in the sensor having an IDE of at least six, for example, when a rate of the transactions is at least ten transactions per second.

BRIEF DESCRIPTION OF THE DRAWINGS

Some embodiments of the invention, both as to organization and method of operation, together with features and advantages thereof, may best be understood by reference to the following detailed description when read with the accompanied drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF SOME DEMONSTRATIVE EMBODIMENTS OF THE INVENTION

In the following detailed description, numerous specific details are set forth in order to provide a thorough understanding of embodiments of the invention. However, it will be understood by those of ordinary skill in the art that embodiments of the invention may be practiced without these specific details. In other instances, well-known methods, procedures, components, units and/or circuits have not been described in detail so as not to obscure the invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Figure 1:
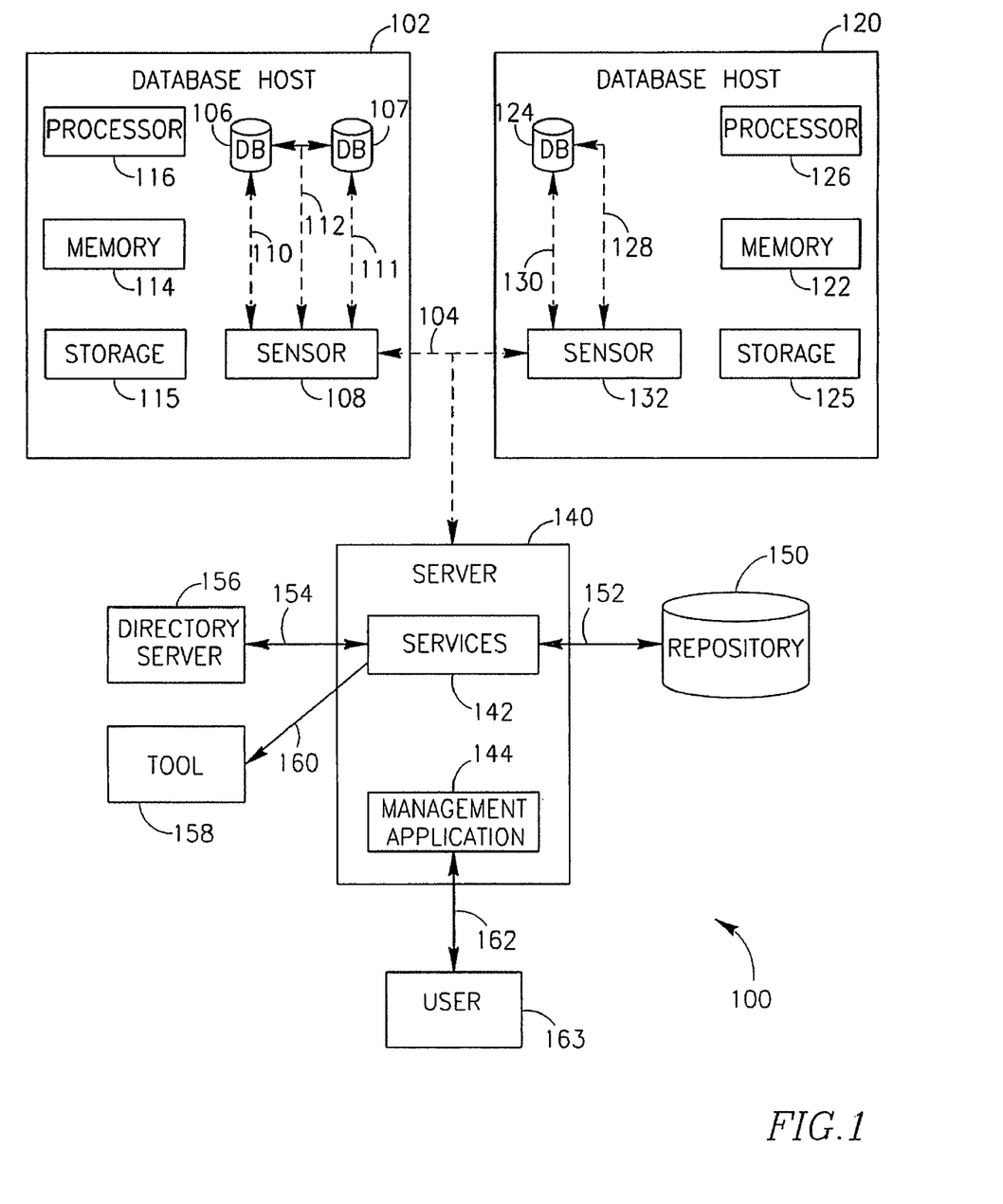
FIG. 1 schematically illustrates a database system, in accordance with some demonstrative embodiments of the invention.

Reference is made to FIG. 1, which schematically illustrates a database system 100, in accordance with some demonstrative embodiments of the invention.

According to some demonstrative embodiments of the invention, system 100 may include one or more databases. For example, system 100 may include a database host 102 able to maintain databases 106 and 107, and a database host 120 able to maintain a database 124. Databases 106, 107 and/or 124 may include any suitable databases, e.g., as are known in the art.

Database hosts 102 and 120 may include any suitable database host, e.g., as are known in the art. For example, database host 102 may include a processor 116, a memory 114, and/or a storage 115 able to maintain and/or manage database 106; and/or database host 120 may include a processor 126, a memory 122, and/or a storage 125 able to maintain and/or manage database 125, e.g., as is known in the art. For example, databases 106 and 107 may be maintained by storage 115, and database 124 may be maintained by storage 125; and/or memories 114 and 122 may store instructions, which when executed by processors 116 and 126, respectively, may result in database management applications to manage databases 106, 107 and 124, e.g., as known in the art.

According to some demonstrative embodiments of the invention, processors 116 and 126 may include, for example, a Central Processing Unit (CPU), a Digital Signal Processor (DSP), a microprocessor, a controller, a chip, a microchip, an Integrated Circuit (IC), or any other suitable multi-purpose or specific processor or controller, e.g., as are known in the art. Memories 114 and 122 may include, for example, a Random Access Memory (RAM), an Erasable Programmable ROM (EPROM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, a hard disk drive or other suitable non-removable storage units or other suitable memory units or storage units. Storages 115 and 125 may include, for example, removable or non-removable media, erasable or non-erasable media, writeable or re-writeable media, digital or analog media, hard disk, floppy disk, CD-RW, optical disk, magnetic media, various types of DVDs, a tape, a cassette, or the like.

Although the invention is not limited in this respect, in some demonstrative embodiments of the invention, database hosts 102 and/or 120 may include relational database hosts. For example, database hosts 102 and/or 120 may manage databases 106, 107 and/or 124 in accordance with any suitable Structured Query Language (SQL) standard, e.g., the SQL-86 standard, the SQL-87 standard, the SQL-89 standard, the SQL-92 standard, the SQL:99 standard, the SQL:2002 standard, the SQL:2003 standard, the SQL:2006 standard, and the like.

According to some demonstrative embodiments of the invention, system 100 may also include one or more intrusion detection sensors to detect intrusion to one or more of the databases, as described in detail below. Although the invention is not limited in this respect, in some demonstrative embodiment of the invention, a sensor may detect intrusion to two or more databases, e.g., as described in detail below. For example, database host 102 may include a sensor 108 able to detect intrusion to databases 106 and 107; and/or database host 120 may include a sensor 132 able to detect intrusion to database 124. Although the invention is not limited in this respect, sensors 108 and/or 132 may be implemented as software sensors. For example, memory 114 may maintain sensor instructions, which when executed by processor 116 may result in sensor 108; and/or memory 122 may maintain sensor instructions, which when executed by processor 126 may result in sensor 132. In one embodiment, sensors 108 and/or 132 may be implemented in any suitable programming language, e.g., C or C++, for example, as a stand-alone process.

According to some demonstrative embodiments of the invention, sensors 108 and/or 132 may be installed at database hosts 102 and/or 120, respectively, e.g., in a separate Operating System (OS) account, using for example, any suitable platform tools, e.g., Red Hat® Package Management (RPM) for a Linux® OS; Microsoft® Installer (MSI) for a Microsoft® Windows® OS; PCK for a Solaris® OS, and the like.

According to some demonstrative embodiments of the invention, system 100 may also include a server 140 able to communicate with sensors 108 and/or 132 via one or more communication links 104, as described in detail below. Communication links 104 may include any suitable communication links, for example, an Extensible Markup Language (XML) link, e.g., a XML streaming over Secure Sockets Layer (SSL) link, as known in the art.

According to some demonstrative embodiments of the invention, server 140 may provide sensors 102 and/or 120 with one or more detection profiles corresponding to databases 106, 107 and/or 124. Sensors 108 and/or 132 may, for example, scan transactions on databases 106, 107 and/or 124, and generate an event corresponding to a suspicious transaction, which may be detected based on the detection profile assigned to databases 106, 107 and/or 124.

The term "transaction", as used herein with relation to a database, may relate to a set, e.g., an atomic set, of one or more instructions, commands, orders, statements and/or or requests to access the database and/or perform on or more operations on the database. The transaction may include, for example, one or more queries to read and/or write information or data in the database. For example, a transaction relating to a money transfer from a first account to a second account may include an operation of debiting the first account and an operation of crediting the second account. The transaction may be implemented in any suitable form.

The term "event", as used herein, may relate to any suitable message, communication, transmission, signal, and/or any other format of code, data, and/or information, which may be generated by an intrusion detection sensor in correspondence with the Suspicious transaction.

According to some demonstrative embodiments of the invention, the detection profile assigned to a database may include, for example, one or more detection rules corresponding to one or more transaction statements to be executed on the database, e.g., s described in detail below.

According to some demonstrative embodiments of the invention the detection rule may include a set of comparator statements, which may be related to one another using one or more logical key words, e.g., "AND", "OR", "NOT", and the like. A comparator statement may include, for example, an identifier, an operator and/or a literal, as are described below.

Although the invention is not limited in this respect, in some demonstrative embodiments of the invention, sensors 108 and/or 132 may terminate a session attempting to perform the suspicious transaction, e.g., based oil the detection profiles. For example, the detection profile assigned to sensor 108 may include a set of one or more predefined detection rules requiring termination of a session, e.g., if violated or triggered. Sensor 108 may terminate a session attempting to perform a suspicious transaction corresponding to the set of predefined rules.

According to some demonstrative embodiments of the invention, the identifier may include any suitable identifier, for example, an identifier having one of three identifier types. A first identifier type may include, for example, a string based identifier, e.g., an identifier matched against a string. Following is a demonstrative, non-limiting, list of string based identifiers, which may be implemented by the detection rule:

action: an action the statement is trying to perform, for example, "select";

instance: may be relevant, for example, for clustered environments, to represent an instance on which the execution is taking place;

user;

osuser;

terminal;

module;

clientid;

schema;

column;

object;

owner;

application;

host;

statement: may include a raw statement, e.g., as sent to the database.

A second identifier type may include, for example, a number based identifier, e.g., an identifier, which may be translated into a number representation. In one example, number-based identifier may relate, for example, to a specific range, e.g., as described below. In another example, the number-based identifier may relate to a fixed set of constants, e.g., as described below. Following is a demonstrative, non-limiting, list of number based identifiers, which may be implemented by the detection rule:

ip: an ip from which a statement is executed from IPs may be in the form of: XXX.XXX.XXX.XXX or XXX.XXX.XXX.XXX/YYY.YYY.YYY.YYY (ip with subnet). One or more elements of the ip may be in a predefined range, for example, the range of 0-255;

month: a month the statement is executed in. For example, JANUARY, FEBRUARY, MARCH, APRIL, MAY, JUNE, JULY, AUGUST, SEPTEMBER, OCTOBER, NOVEMBER, DECEMBER, or any other representation e.g., a short representation, for example, JAN;

weekday: a day of the week the statement is executed in. For example: SUNDAY, MONDAY, TUESDAY, WEDNESDAY, THURSDAY, FRIDAY, SATURDAY, or any other representation e.g., a short representation, for example, TUE;

hour: an hour the statement is executed in. May be in the form XX:YY where XX is in the range of 0-23 and YY in the range of 0-59;

day: a day of the month the statement is executed in. For example, an integer in the range of 1-31;

date: a date the statement is executed in. May be in the form MM/DD/YY (US date format), for example Jan. 25, 2007.

A third identifier type may include, for example, an enumerated identifier, e.g., an identifier which may represent a fixed set of constants, which may not be translated into a number representation. For example, the enumerated identifier may include the following identifier:

context: may include, for example, one of JAVA, SQL, PL/SQL;

According to some demonstrative embodiments of the invention, the operator may include any suitable operator, e.g., as follows:

=: equals—may be used, for example in association with all three types of identifiers;

<: less—may be used, for example in association with the number based identifiers;

>: greater—may be used, for example in association with the number based identifiers;

<=: less equals—may be used, for example in association with the number based identifiers;
>=: greater equals—may be used, for example in association with the number based identifiers;
< >: not equal—may be used, for example in association with all three types of identifiers;
(not)? like: compare a to a string supporting the '%' character as a symbol to any string—may be used, for example in association with the string based identifiers;
between: may be used, for example, to check if an identifier is between two values—may be used, for example in association with the number based identifiers;
(not)? in: may be used, for example, to check if an identifier is in a list of values—may be used, for example in association with all three types of identifiers;
(not)? matches: may be used, for example, to perform a regular expression match—may be used, for example in association with the string based identifiers;
(not)? contains: may be used, for example, to perform a simple and fast string match—may be used, for example in association with the string based identifiers.

According to some demonstrative embodiments of the invention, databases 106, 107 and/or 124 may include transactional databases, for example, databases subject to a relatively high transaction rate, for example, a transaction rate of at least ten Transactions Per Second (TPS), e.g., at least 20 TPS. In some non-limiting embodiments, databases 106, 107 and/or 124 may be subject, for example, to a transaction rate of at least 50 TPS, such as at least 100 TPS, e.g., at least 250 TPS. In other non-limiting embodiments, databases 106, 107 and/or 124 may be subject, for example, to a transaction rate of at least 500 TPS, such as at least 750 TPS, e.g., at least 1000 TPS.

According to some demonstrative embodiments of the invention, one or more elements of system 100 may enable performing intrusion-detection operations on databases 106, 107 and/or 124, without substantially affecting the operation of databases 106, 107 and/or 120, e.g., even at high transaction rates. According to some demonstrative embodiments of the invention, sensors 108 and/or 132 may perform intrusion detection operations on databases 106, 107 and/or 124, for example, without substantially affecting the operation and/or management of databases 106, 107 and/or 124, e.g., as described in detail below.

According to some demonstrative embodiments of the invention, sensors 108 and/or 132 may have an intrusion-detection-efficiency (IDE) of at least six, e.g., when databases 106, 107 and/or 124, are subject to a predefined transaction rate, e.g., a rate of at least ten TPS, as described in detail below.

According to some demonstrative embodiments of the invention, the IDE of a sensor associated with a database may relate to a ratio between an intrusion-detection-success-rate (IDSR) of the sensor and processor utilization by the sensor, denoted %CPU. Processor utilization may be measured using any suitable method as is known in the art, for example, an OS measurement tool.

According to some demonstrative embodiments of the invention, the IDSR of the sensor may be measured, for example, by assigning to the sensor a predefined test profile, e.g., a test profile defining an event is to be generated by the sensor in response to each of a plurality of select operations performed on the database. For example the test profile may include the following rule, e.g., with relation to an Oracles® SQL database:
object='sys.dual'

The IDSR may be measured, for example, using a script that, when executed on the database, may randomly access the database at a predefined rate, e.g., ten TPS.

The IDSR of the sensor may be determined, for example, as a ratio between a number of events generated by the sensor, denoted $N_{events}$, and a number of the plurality of select operations, denoted $N_{select}$ For example, the IDSR of the sensor may be determined as follows:

$$IDSR = \left(\frac{N_{events}}{N_{select}}\right)\bigg|_{Testprofile} \quad (1)$$

The IDE of the sensor may be determined, for example, as follows:

$$IDE = \left(\frac{IDSR}{CPU\%}\right)\bigg|_{TPR \geq 10} \quad (2)$$

According to some demonstrative embodiments of the invention, the IDE of sensor 108 may be measured, for example, by providing sensor 108 with the test profile described above, accessing databases 106 and/or 107 at a TPS of at least ten, detecting the number of events generated by sensor 108, measuring the % CPU of processor 116, and applying Equations 1 and 2. Accordingly, the IDE of sensor 132 may be measured, for example, by providing sensor 132 with the test profile described above, accessing database 124 at a TPS of at least ten, detecting the number of events generated by sensor 132, measuring the % CPU of processor 126, and applying Equations 1 and 2.

In one demonstrative embodiment of the invention, sensors 108 and/or 132 may have an IDE of at least 6.3, e.g., an IDE of at least 6.5. In another demonstrative embodiment of the invention, sensors 108 and/or 132 may have an IDE of at least 6.7, e.g., an IDE of at least 7. In another demonstrative embodiment of the invention, sensors 108 and/or 132 may have an IDE of at least 7.3, e.g., an IDE of at least 7.5. In yet another demonstrative embodiment of the invention, sensors 108 and/or 132 may have an IDE of at least 8, e.g., an IDE of at least 10. In yet another demonstrative embodiment of the invention, sensors 108 and/or 132 may have an IDE of at least 12, e.g., an IDE of at least 20.

In one demonstrative embodiment of the invention, sensors 108 and/or 132 may have an IDSR of at least 90%, e.g., an IDSR of at least 92%. In another demonstrative embodiment of the invention, sensors 108 and/or 132 may have an IDSR of at least 94%, e.g., an IDSR of at least 96%. In another demonstrative embodiment of the invention, sensors 108 and/or 132 may have an IDSR of at least 97%, e.g., an IDSR of at least 98%. In yet another demonstrative embodiment of the invention, sensors 108 and/or 132 may have an IDSR of at least 99%, for example, an IDSR of at least 99.5%, e.g., an IDSR of substantially 100%.

In one demonstrative embodiment of the invention, at a TPS of at least ten the processor utilization of sensors 108 and/or 132 may be equal to or smaller than 15%, e.g., equal to or smaller than 14%. In another demonstrative embodiment of the invention, at a TPS of at least ten the processor utilization of sensors 108 and/or 132 may be equal to or smaller than 13%, e.g., equal to or smaller than 12%. In another demonstrative embodiment of the invention, at a TPS of at least ten the processor utilization of sensors 108 and/or 132 may be equal to or smaller than 10%, e.g., equal to or smaller than 8%. In another demonstrative embodiment of the invention, at a TPS of at least ten the processor utilization of sensors 108 and/or 132 may be equal to or smaller than 7%, e.g., equal to or smaller than 5%. In yet another demonstrative embodiment of the invention, at a TPS of at least ten the processor utilization of sensors 108 and/or 132 may be equal to or smaller than 4%, for example, equal to or smaller than 2%, e.g., equal to or smaller than 1%.

According to some demonstrative embodiments of the invention, sensors 108 and/or 132 may directly access databases 106, 107 and/or 124. In one non-limiting embodiment, databases 106, 107 and/or 124 may be managed, for example, over a System Global Area (SGA), e.g., of memories 114 and/or 122, respectively. According to this embodiment, sensors 108 and/or 132 may, for example, access the SGAs of databases 106, 107 and/or 124, respectively, via Direct Memory Attachments (DMAs) 110, 111, and/or 130, respectively, as described in detail below. Additionally, sensors 108 and/or 132 may, for example, communicate with databases 106, 107 and/or 124, respectively, via links 112 and 128, as described in detail below. Links 112 and/or 118 may include, for example, Oracle Call Interface (OCI) links and/or any other suitable links as are known in the art.

According to some demonstrative embodiments of the invention, server 140 may receive, e.g., over one or more links 104, the events generated by sensors 108 and/or 132. In some demonstrative embodiments of the invention, server 140 may store the received events and/or information relating to the events in a repository 150, e.g., using a Java Database Connectivity (JDBC) interface 152, or any other suitable interface. Repository 150 may include any suitable repository, e.g., internal to or external to server 140.

According to some demonstrative embodiments of the invention, server 140 may include a services module 142 able to communicate with one or more directory servers 156, e.g., using a Lightweight Directory Access Protocol (LDAP) interface 154 or any other suitable interface. Additionally or alternatively services module 142 may communicate with one or more monitoring and/or management tools 158, e.g., using a Simple Network Management Protocol (SNMP) interface 160 or any other suitable interface.

According to some demonstrative embodiments of the invention, server 140 may include a management application 144, e.g., a web management application, able to manage and/or configure the operation of server 140, and/or sensors 108 and/or 132. For example, application 144 may manage the profiles associated with databases 106, 107 and/or 132, and/or configure events received from sensors 108 and/or 132. Application 144 may communicate with a user 163, e.g., an administrator, over a connection 162, e.g., a Hypertext Transfer Protocol over Secure Sockets Layer (HTTPS).

According to some demonstrative embodiments of the invention, server 140 may generate one or more alerts based on the events received from sensors 108 and/or 132. For example, server 140 may apply any suitable alert criteria to determine whether to generate one or more alerts corresponding to the events received from sensors 108 and/or 132. The alert criteria may also define one or more recipients intended to receive the alerts, e.g., one or more applications, tools, users, administrators, and the like. For example, server 140 may maintain a set of one or more alert definitions identifying a set of one or more alerts to be generated. An alert definition corresponding to an alert may include, for example, a type of the alert, a content of the alert, a destination of the alert, and the like. A first alert definition may define, for example, a first alert is to be provided to a first destination if, for example, one or more of a first set of predefined events are received from sensors 108 and/or 132. A second alert definition may define, for example, a second alert is to be provided to a second destination if, for example, one or more of a second set of predefined events are received from sensors 108 and/or 132. The first and second destinations may include any suitable destination. In one example, server 140 may provide one or more of the alerts to one or more predefined users via Electronic-mail (Email), a Short Message Service (SMS), and the like. In another example, the destinations may include one or more monitoring applications, for example, an HP Open-View® (HPOV) application, and the like; one or more Security Operations Centers (SOCs); one or more Security Information and Event Management (SIEM) tools, and the like.

In some demonstrative embodiments of the invention, application 144 may include a Graphical User Interface (GUI) to communicate with user 163, e.g., to receive one or more definitions of the detection rules detection profiles, and/or the alert criteria; and/or to display to the user 163 information relating to the alerts and/or events in any suitable format.

Figure 2:
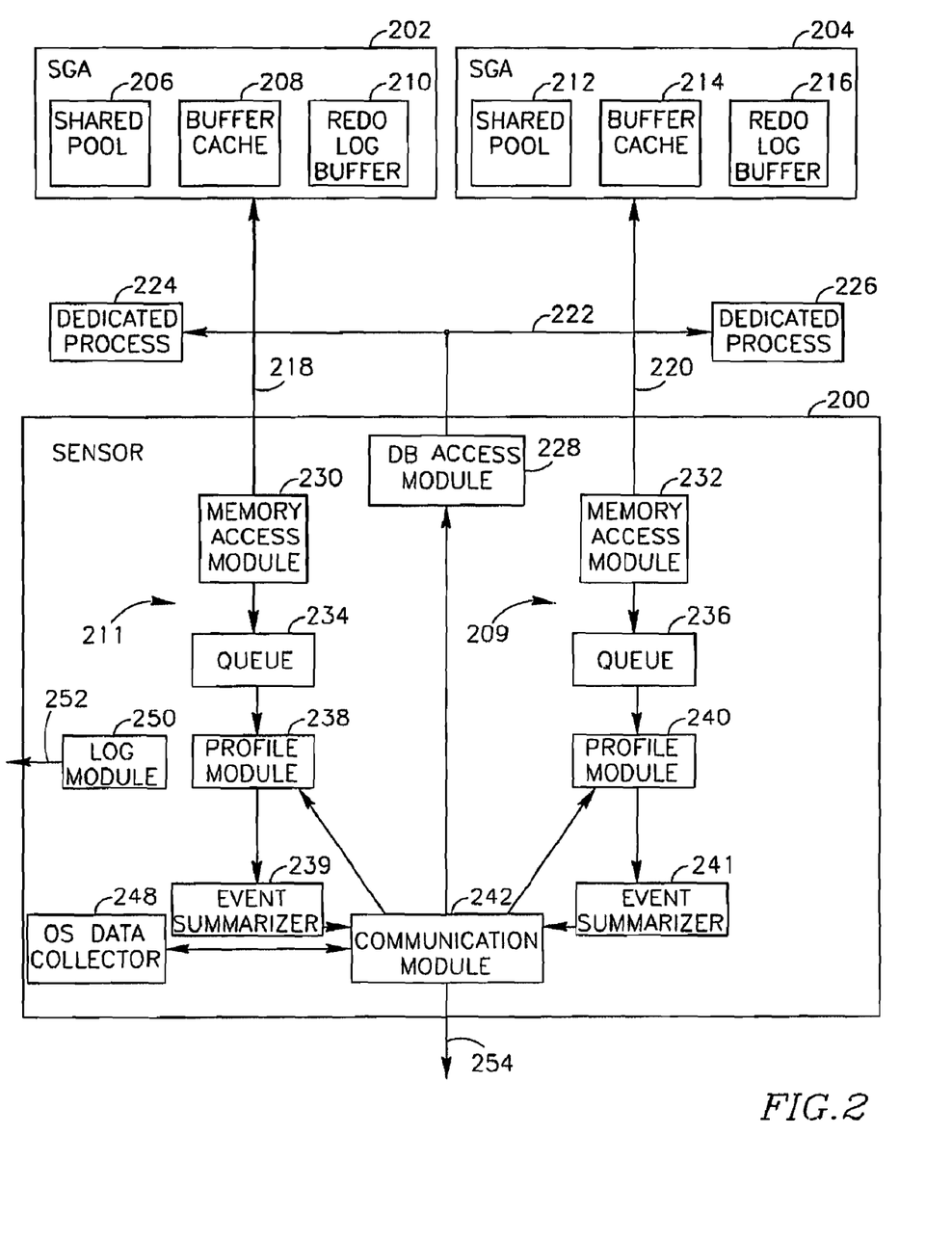
FIG. 2 schematically illustrates an intrusion detection sensor, in accordance with some demonstrative embodiments of the invention.

Reference is now made to FIG. 2, which schematically illustrates an intrusion detection sensor 200, in accordance with some demonstrative embodiments of the invention. Although the invention is not limited in this respect, sensor 200 may perform the functionality of sensor 108 (FIG. 1).

According to some demonstrative embodiments of the invention, sensor 200 may include a database access module 228 able to access at least one database. For; example, database access module 228 may access, e.g., via an OCI 222, at least one dedicated server process, e.g., dedicated processes 224 and 226 associated with at least one database, e.g., databases 106 and 107 (FIG. 1), respectively.

According to some demonstrative embodiments of the invention, sensor 200 may also include a communication module 242 able to communicate with a server, e.g., server 140 (FIG. 1) using any suitable communication protocol and/or method, e.g., over a XML (SSL) link. In one example, communication module 242 may perform a SSL handshake with two-way certificate authentication with the server, e.g., in order to prevent impersonation; and perform asynchronous XML message exchanges with the server.

According to some demonstrative embodiments of the invention, communication module 242 may receive from the server detection profiles to be applied to the at least one database. For example, communication module 242 may receive from server 140 (FIG. 1) a first detection profile to be applied to database 106 (FIG. 1), and a second detection profile to be applied to database 107 (FIG. 1). In some non-limiting embodiments, communication module 242 may parse the first and/or second detection profiles, for example, using a suitable XML parser, e.g., libxml2; and provide the parsed profiles to profile modules 238 and/or 240, as are described in detail below. Communication module 242 may also communicate to the server, e.g., periodically, events generated by profile modules 238 and/or 240, e.g., as described in detail below.

According to some demonstrative embodiments of the invention, communication module 242 may also cause database access module 228 to terminate a session with SGAs 202 and/or 204, e.g., if a detection rule of the set of one or more predefined detection rules requiring termination of a session is triggered, e.g., as described above.

According to some demonstrative embodiments of the invention, sensor 200 may include a log module 250 to maintain a log of one or more of the events generated by sensor 200. Log module 250 may include any suitable log module, e.g., able to write the one or more events to a machine syslog. Log module 250 may support, for example, one or more log levels, e.g., TRACE, DEBUG, INFO, WARN, ERROR, and/or FATAL log levels, as are known in the art.

According to some demonstrative embodiments of the invention, sensor 200 may include an OS data collector module 248 to determine any suitable OS data, for example, data relating to the processor utilization and/or memory consumption by sensor 200. Module 248 may also provide at least some of the OS data to communication module 242. Communication module 242 may communicate the OS data to the server, e.g., server 140 (FIG. 1).

According to some demonstrative embodiments of the invention, sensor 200 may also include at least one database thread to be associated with at least one SGA of the at least one database, respectively. For example, sensor 200 may include first database thread 211 associated with a SGA 202 of a first database, e.g., database 106 (FIG. 1), and a second database thread 209 associated with a SGA 204 of a second database, e.g., database 107 (FIG. 1). SGAs 202 and 204 may include, for example, shared pools 206 and 212, respectively; database buffer caches 208 and 214, respectively; and/or redo log buffers 210 and 216, respectively, as are all well known in the art.

Some demonstrative embodiments of the invention are described herein with reference to a sensor, e.g., sensor 200, including two database threads, e.g., threads 209 and 211, to be associated with two database SGAs, e.g., SGAs 202 and 204. However, the invention is not limited in this respect and in other embodiments of the invention the sensor may include any other suitable number of database threads. In one example, the sensor may include a single database thread to be associated with an SGA of a single database. In another example, the sensor may include three or more database threads to be associated with three or more respective SGAs of three or more databases, respectively.

According to some demonstrative embodiments of the invention, database threads 211 and 209 may include memory access modules 230 and 232, respectively, able to directly access SGAs 202 and 204, respectively. Memory access module 230 may retrieve from SGA 202 a plurality of statements, dependencies and/or any other suitable information; and/or memory access module 232 may also retrieve from SGA 204 a plurality of statements, dependencies and/or any other suitable information, as described in detail below.

According to some demonstrative embodiments of the invention, a data structure of SGAs 202 and/or 204 may correspond to a predefined configuration of the databases associated with SGAs 202 and/or 204. The data structure of the SGA may include, for example, a plurality of memory areas ("the session areas") to maintain a plurality of sessions, respectively. The plurality of sessions may correspond, for example, to a respective plurality of users accessing the database, as known in the art. A session area may include, for example, a memory area to maintain a statement previously executed on the database ("the previous statement"), and a statement to be executed on the database ("the current statement"), as are known in the art. The session area may also include one or more dependencies corresponding to the current statement, such as, database objects accessed by the current statement; and/or one or more dependencies corresponding to the previous statement, such as, database objects accessed by the previous statement, as are all known in the art.

According to some demonstrative embodiments of the invention, memory access modules 230 and/or 232 may include predetermined structure maps of SGAs 202 and/or 204, respectively. The structure maps may include, for example, parameters defining one or more of the session area, the previous statement, the current statement, and/or the dependencies corresponding to the current and/or previous statements. According to these demonstrative embodiments of the invention, sensor 200 may access memory areas of SGAs 202 and/or 204, e.g., directly, based, for example, on the predetermined structure maps, e.g., without the need to detect and/or compute the parameters relating to these areas. Accordingly, the processor utilization by sensor 200 may be reduced, e.g., compared to a processor utilization required for computing and/or detecting the parameters relating to the session area, the previous statement, the current statement, and/or the dependencies corresponding to the current and/or previous statements.

In one demonstrative embodiment of the invention, the structure maps corresponding to SGAs 202 and/or 204 may be predetermined by performing, e.g., offline, a dump operation on SGAs 202 and 204, e.g., using a oradebug operation, into one or more predefined dump files; and generating the map structures based on the dump files. For example, a code in a form executable by modules 230 and 232, e.g., a "C" code, may be generated based on the dump files. The structure maps may include, for example, information representing the following parameters:

Fixed memory offsets
        Version offset
        Base SGA address
        Sid and dbname offsets
        ksusg offset—for num and xsuse
    ksuse offsets
    ksuse struct including all session variables
    kglna struct
    kglhd struct
    kglob struct
    ksupr struct According to some demonstrative embodiments of the invention, a dependency tree corresponding to a statement may be defined based on the kglhd and kglna parameters.

According to some demonstrative embodiments of the invention, memory access modules 230 and/or 232 may scan SGAs 202 and/or 204, respectively, e.g., repeatedly, at a predefined scanning rate, as described below.

According to some demonstrative embodiments of the invention, modules 232 and/or 230 may scan SGAs 202 and/or 204, respectively, based on the predetermined structure maps corresponding to SGAs 202 and/or 204, respectively, as described in detail below. For example, when performing a scan of SGA 202, module 230 may extract transaction information corresponding to transactions performed by sessions being connected to SGA 202 during the scan, e.g., based on the predetermined structure map of SGA 202. When performing a scan of SGA 204, module 232 may extract transaction information corresponding to transactions performed by sessions being connected to SGA 204 during the scan, e.g., based on the predetermined structure map of SGA 204.

Although the invention is not limited in this respect, the transaction information may include, for example, information relating to one or more statements, e.g., a current statement, a previous statement, and/or dependencies resulting from the statements, e.g., as described below with reference to FIG. 3.

According to some demonstrative embodiments of the invention thread 21 may include a transaction queue 234 to queue the transaction information provided by memory access module 230; and/or thread 209 may include a transaction queue 236 to queue transaction information provided by memory access module 232. Transaction queues 234 and 236 may include any suitable queues, e.g., a First In First Out (FIFO) queue, as known in the art.

According to some demonstrative embodiments of the invention, threads 211 and/or 209 may include profile modules 238 and/or 240, respectively. Modules 238 and/or 240 may receive detection profiles and/or updates corresponding to the detection profiles from communication module 242. Modules 238 and/or 240 may generate one or more events, e.g., based on the detection profiles assigned to modules 238 and/or 240, respectively. For example, modules 238 and/or 240 may selectively generate the events based on an evaluation of one or more detection rules, as described below.

According to some demonstrative embodiments of the invention, profile modules 238 and/or 240 may be implemented in any suitable format and/or using any suitable programming language. For example, profile modules 238 and/or 240 may be implemented by C++ code, e.g., using an antlr library to evaluate detection rules of the corresponding detection profiles. Profile module 238 may analyze, for example, transaction information received from queue 234, and generate events based on the detection rules of the rules detection profile assigned to module 238. For example, profile module 238 may determine whether the transaction information triggers one or more detection rules of the detection profile assigned to module 238, e.g., as described below. Profile module 238 may generate an event corresponding to the transaction information if, for example, one or more rules of the detection profile are triggered by the transaction information. Profile module 240 may analyze, for example, transaction information received from queue 236, and generate events based the detection profile assigned to module 240, e.g., as described below with reference to FIG. 4. For example, profile module 240 may determine whether the transaction information triggers one or more detection rules of the detection profile assigned to module 240, e.g., as described below. Profile module 240 may generate an event corresponding to the transaction information if, for example, one or more rules of the detection profile are triggered by the transaction information, e.g., as described below with reference to FIG. 4.

According to some demonstrative embodiments of the invention, threads 211 and/or 209 may optionally include event summarizers 239 and/or 241, respectively. Event summarizers 239 and/or 241 may summarize and/or combine a plurality of events generated by profile modules 239 and/or 240, respectively, into one or more summarized events to be provided to communication module 242, in accordance with any suitable criterion. For example event summarizer 239 may combine a plurality events received from profile module 238 into a single summarized event to be provided to communication module. The plurality of events may include, for example, two or more events relating to a common session. Accordingly, event summarizer 239 may generate a single event corresponding to the session. As a result, the processor utilization by sensor 200 may be reduced since, for example, communication module 242 may communicate the single event resulting from the plurality of events instead of communicating the plurality of events.

Figure 3:
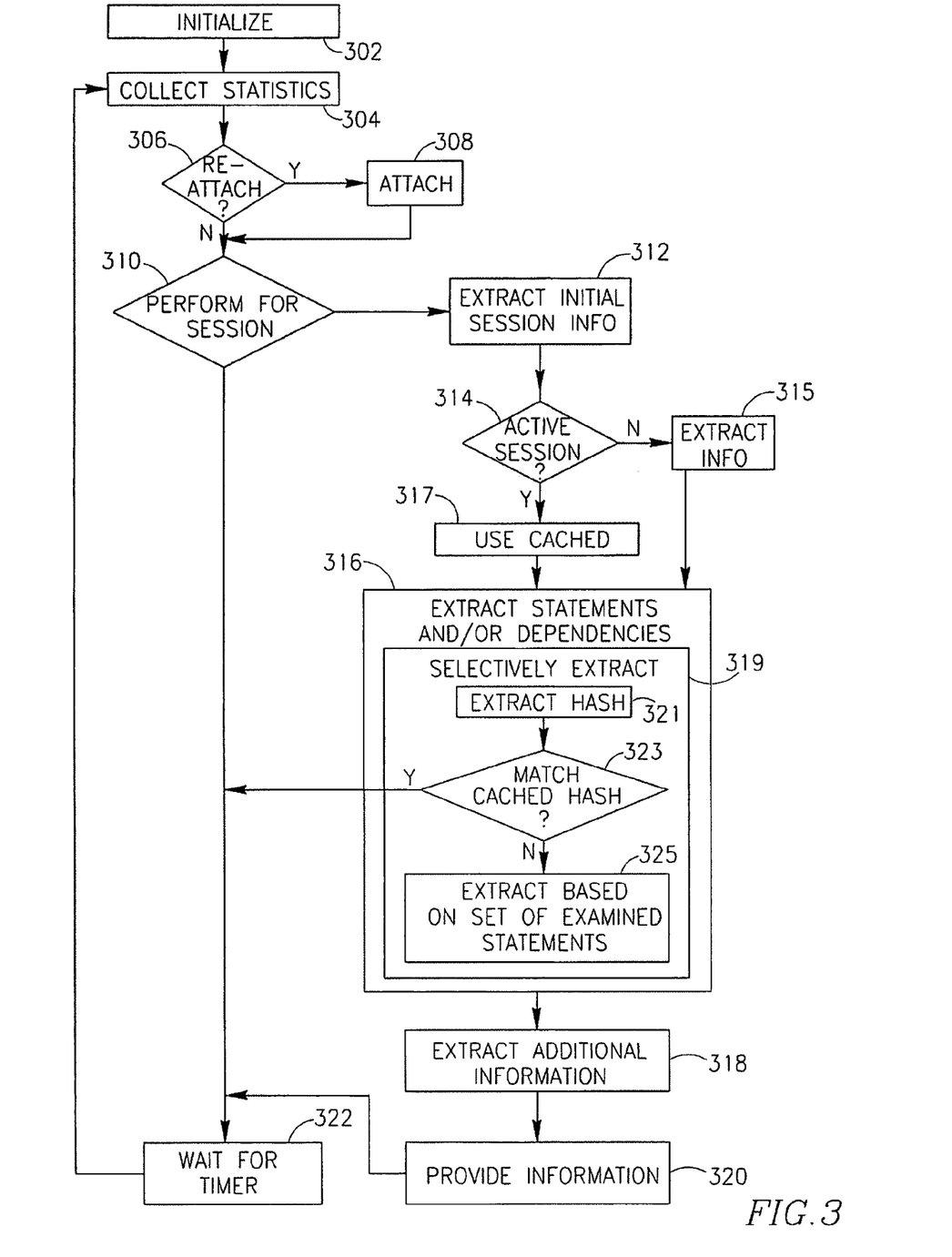
FIG. 3 schematically illustrates a flowchart of method of scanning a database, in accordance with some demonstrative embodiments of the invention.

Reference is now made to FIG. 3, which schematically illustrates a method of scanning a SGA, in accordance with some demonstrative embodiments of the invention. Although the invention is not limited in this respect, one or more operations of the method of FIG. 3 may be performed by a memory access module to scan a SGA. For example, memory access module 230 (FIG. 2) may perform one or more operations of the method of FIG. 2, e.g., to scan SGA 202 (FIG. 2); and/or memory access module 232 (FIG. 2) may perform one or more operations of the method of FIG. 2, e.g., to scan SGA 204 (FIG. 2).

According to some demonstrative embodiments of the invention, the method may include scanning the SGA at a predefined scanning rate. For example, as indicated at block 322, the method may include repeatedly performing a scan sequence, e.g., including one or more of the operations described below with reference to blocks 304, 306, 308, 310, 312, 314, 315, 316, 317, 318, and/or 320, at a predefined scanning rate. For example, the method may include requesting an OS, e.g., an OS executed by processor 116 (FIG. 1), to execute an OS timer application able to provide a timer signal within a predefined timer period corresponding to the scanning rate. The timer period may be equal to 20 milliseconds if, for example, the scanning rate is equal to 50 scans per second.

According to some demonstrative embodiments of the invention, the scan sequence may include extracting transaction information corresponding to a plurality of sessions being connected to the database during the scan sequence ("the connected sessions"). As indicated at block 310, the method may include performing for at least one of the connected sessions ("the current session"), e.g., for each of the sessions, one or more of the operations described below with reference to blocks 312, 314, 315, 316, 317, 318, and/or 320.

As indicated at block 312, the method may include extracting initial session information corresponding to the current session, e.g., as described below. As indicated at block 314, the method may also include determining whether the current session is an active session, for example, a session which has been previously scanned, e.g., in a previous scanning sequence. The method may include extracting additional session information from the SGA, e.g., if the session is not an active session, as described in detail below.

In some demonstrative embodiments of the invention, the memory access module, e.g., modules 230 and/or 232 (FIG. 2) may maintain session information relating to the connected sessions ("the cached session information"). The cached session information may include, for example, session identification information, and other session information. The session identification information may include, for example, an identifier of the session ("the session ID") and a session serial number, e.g., as are known in the art. The other session information may include for example, a username, an ouser name, a source host, an action, a module, a client identifier, a program, a logon time, and the like. According to these demonstrative embodiments, extracting the initial session information may include, for example, extracting from the SGA the session identification information corresponding to the current session, e.g., based on the predetermined structure map corresponding to the SGA. Determining whether the current session is an active session may include, for example, comparing the extracted session identification information to the cached session identification information. The current session may be determined to be an active session if, for example, the extracted session identification information matches the cached session identification information.

As indicated at block 317, according to some demonstrative embodiments of the invention, the method may include using the cached session information as the current session information, e.g., instead of extracting the other session information from the SGA, if for example, the current session is determined to be an active session. Using the cached session information may reduce the time and/or processor utilization required for performing the scanning sequence.

As indicated at block 315, the method may include extracting the other session information from the SGA, e.g., if the current session is not determined to be active. The extracted session information may be cached by the memory access module, e.g., for future use in a subsequent scan sequence.

As indicated at block 316, the method may also include extracting one or more statements corresponding to the current session, and/or one or more dependencies of the statements, e.g., as described below.

According to some demonstrative embodiments of the invention, the SGA may maintain hash values corresponding to the statements, e.g., hash values corresponding to the current and previous statements of a session, as known in the art. The memory access module may maintain hash values corresponding to one or more statements of a previous scan sequence corresponding to the session ("the cached hash values"). For example, memory access modules 232 and/or 230 (FIG. 2) may maintain for one or more of the active sessions, e.g., for each of the active sessions, hash values corresponding to the current and previous statements during the preceding scanning sequence.

As indicated at bock 319, according to some demonstrative embodiments of the invention, extracting the statements may include selectively extracting the statements, e.g., based on the cached hash values, e.g., as described below.

As indicated at block 321, selectively extracting the statements may include extracting from the SGA the hash values corresponding to the statements ("the extracted hash values"), e.g., based on the predetermined structure maps.

As indicated at block 323, selectively extracting the statements may also include comparing the extracted hash values to the cached hash values. Selectively extracting the statements may also include, for example, extracting the statements only if the extracted hash values do not match the cached hash values. The method may include, for example, advancing to scan a next session, e.g., without extracting the statements corresponding to the current session, if, for example, the extracted hash values match the cached hash values.

Extracting the statements corresponding to the current session, e.g., based on the cached hash values, may reduce the time and/or processor utilization required for performing the scanning sequence.

According to some demonstrative embodiments of the invention, the statements may be located, e.g., based on the predefined structure maps maintained by the memory access module. For example, the structure map may include a memory location of a child handle and a child name, as are known in the art, corresponding to the statements. Locating the statements based on the predetermined structure maps may reduce the time and/or processor utilization required for performing the scanning sequence.

According to some demonstrative embodiments of the invention, it may be desired to examine a predefined set of one or more statements ("the examined statements"), e.g., while not examining other statements. For example, the examined statements may include statements, e.g., statements relating to a table of credit card or bank account details, which may be identified as being vulnerable to an intrusion operation. According to these embodiments of the invention, the memory access module may maintain information identifying the set of examined statements, e.g., child names of the examined statements.

As indicated at block 325, according to some demonstrative embodiments, extracting the statements may include selectively extracting the statements based on the set of examined statements. For example, selectively extracting the statements may include comparing the child name of the statement to the set of examined statements. Selectively extracting the statements may also include, for example, extracting a statement and/or dependencies of the statement only if the extracted child name of the statement corresponds to one of the set of examined statements. The method may include, for example, avoiding the extraction of a statement and/or dependencies of the statement, if the statement does not correspond to the set of examined statements. Extracting the statements and/or dependencies based on the set of examined statements, may reduce the time and/or processor utilization required for performing the scanning sequence.

According to some demonstrative embodiments of the invention, extracting the dependencies of the statement may include, for example, checking a dependent tree resulting from the statement, e.g., recursively. Extracting the dependencies of the statement may also include extracting the statement dependencies into a vector. The location of the dependencies may be determined, for example, based on the predefined structure map.

As indicated at block 318, the method may also include extracting additional information based, for example, on the detection profile assigned to the database. Extracting the additional information may include, for example, extracting the additional information from predetermined memory areas of the SGA, e.g., based on the predetermined structure map.

According to some demonstrative embodiments of the invention, some detection rules may be based on a number of records to be extracted from the database as a result from the statement and/or dependencies ("the number of extracted records"). For example, a detection rule may relate to a number of records to be extracted from a table including credit-card information and/or bank account information. According to these embodiments, extracting the additional information may include extracting from the SGA the number of extracted records, e.g., if the detection rule is based on the number of extracted records. In one example, the SGA may also maintain an optimizer able to estimate the number of extracted records, e.g., as is known in the art. The predetermined structure map may include, for example, a memory location of optimizer data corresponding to the statement. According to this example, extracting the dependencies may also include querying the optimizer for the number of extracted records, e.g., if the detection rule is based on the number of extracted records.

As indicated at block 320, the method may also include providing the extracted statement and/or dependencies information, and/or the additional information. For example, memory access module 230 (FIG. 2) may provide transaction queue 234 (FIG. 2) with transaction information including the statement information, dependencies information, and/or the additional information extracted from SGA 202 (FIG. 2). Memory access module 232 (FIG. 2) may provide, for example, transaction queue 236 (FIG. 2) with transaction information including the statement information, dependencies information, and/or the additional information extracted from SGA 204 (FIG. 2).

As indicated at block 304, according to some demonstrative embodiments of the invention the method may also include collecting statistical information corresponding to the scan sequence. The statistical information may include, for example, any suitable information relating to the extracted statements and/or dependencies, e.g., a number of extracted statements, and the like.

As indicated at blocks 306 and 308, according to some demonstrative embodiments of the invention the method may also include determining whether to re-attach to the database, based on any suitable re-attach criteria. For example, the re-attach criteria may define the sensor is to perform a re-attach operation to the database after a predefined time period, if a number of sessions allowed to connect to the database has changed, if a connection with the database has been terminated, and/or any other suitable criteria.

As indicated at block 302, according to some demonstrative embodiments of the invention, the method may include initializing the scanning operation. For example, memory access modules 230 and 232 (FIG. 2) may initialize the structure map corresponding to SGAs 202 and 204 (FIG. 2), respectively; set the OS timer, set a longiup, and the like.

Referring back to FIG. 2, according to some demonstrative embodiments of the invention, profile modules 238 and/or 240 may modify or optimize the detection rules, based on predefined optimization criteria, e.g., as described below.

According to some demonstrative embodiments of the invention, one or more of the detection rules may be represented using a plurality of trees, such as a "forest" of trees. The plurality of trees may represent, for example, a plurality of detection rules, e.g., respectively. Profile modules 238 and/or 240 may construct a tree corresponding to a detection rule. The constructed tree may have nodes representing logical operators of the rule, e.g., AND, OR, and the like; and/or actual operators of the rule, e.g., "equals", and the like. The constructed tree may have "leaves" representing the identifiers and/or literals of the rule. Profile modules 238 and/or 240 may apply to the constructed tree the transaction information, e.g., received from queues 234 and/or 236, respectively. The transaction information may include, for example, the session, statement and/or dependency information corresponding to a transaction to be analyzed, as described above with reference to FIG. 3. Profile modules 238 and/or 240 may also evaluate whether a node of the tree results in a true or false value. The detection rule may be triggered if, for example, the tree has a true value. Profile modules 238 and/or 240 may generate an event corresponding to the transaction if, for example, the detection rule is triggered.

According to some demonstrative examples, profile modules 238 and/or 240 may evaluate nodes of the trees at an order resulting from a predefined criterion. For example, the order may be based on a time required to evaluate the nodes, and/or a degree of efficiency of evaluating the nodes. For example, profile modules 238 and/or 240 may evaluate nodes, which may be evaluated relatively quickly and/or efficiently ("the easy nodes"), before evaluating nodes, which may require relatively complex and/or time-consuming operations ("the complex nodes"). This may enable avoiding the evaluation of one or more of the complex nodes, e.g., based on the results of the evaluation of the easy nodes. Avoiding the evaluation of one or more of the complex nodes may reduce the time and/or processor utilization required by sensor 200.

According to some demonstrative examples, some detection rules may be evaluated based directly on the current session, e.g., and not affected by statements of the current session. Accordingly, it may be advantageous to evaluate such rules only once per the current session, e.g., while avoiding evaluating the rules for statements of the current session. Profile modules 238 and/or 240 may, for example, maintain a session cache for one or more, e.g., each, of the connected sessions. Profile modules 238 and/or 240 may initialize the session cache, for example, when the session is created, e.g., based on the extracted session information described above with reference to block 315 (FIG. 3). The session cache may maintain for at least one of the detection rules, e.g., for, each of the detection rules, a value indicating whether the detection rule is to be evaluated as true or false for the corresponding session, e.g., no matter what the statements are. Implementing the session cache may reduce the time and/or processor utilization required by profile modules 238 and/or 240 to evaluate the detection rules.

According to some demonstrative embodiments of the invention, profile modules 238 and/or 240 may control the scanning rate of memory access modules 230 and/or 232, respectively, based on any suitable predefined criteria. For example, profile module 238 may cause memory access module 230 to increase the scanning rate for scanning SGA 202, for example, in accordance with the number of events generated by profile module 238. In one example, profile module 238 may cause memory access module 230 to scan SGA 202 at a first scanning rate, e.g., as long as no event is generated. Profile module 238 may cause memory access module 230 to scan SGA 202 at a second scanning rate, e.g., faster than the first rate, upon generating a first event. Profile module 238 may cause memory access module 230 to scan SGA 202 at a third scanning rate, e.g., faster than the second rate, upon generating a more than one event.

Figure 4:
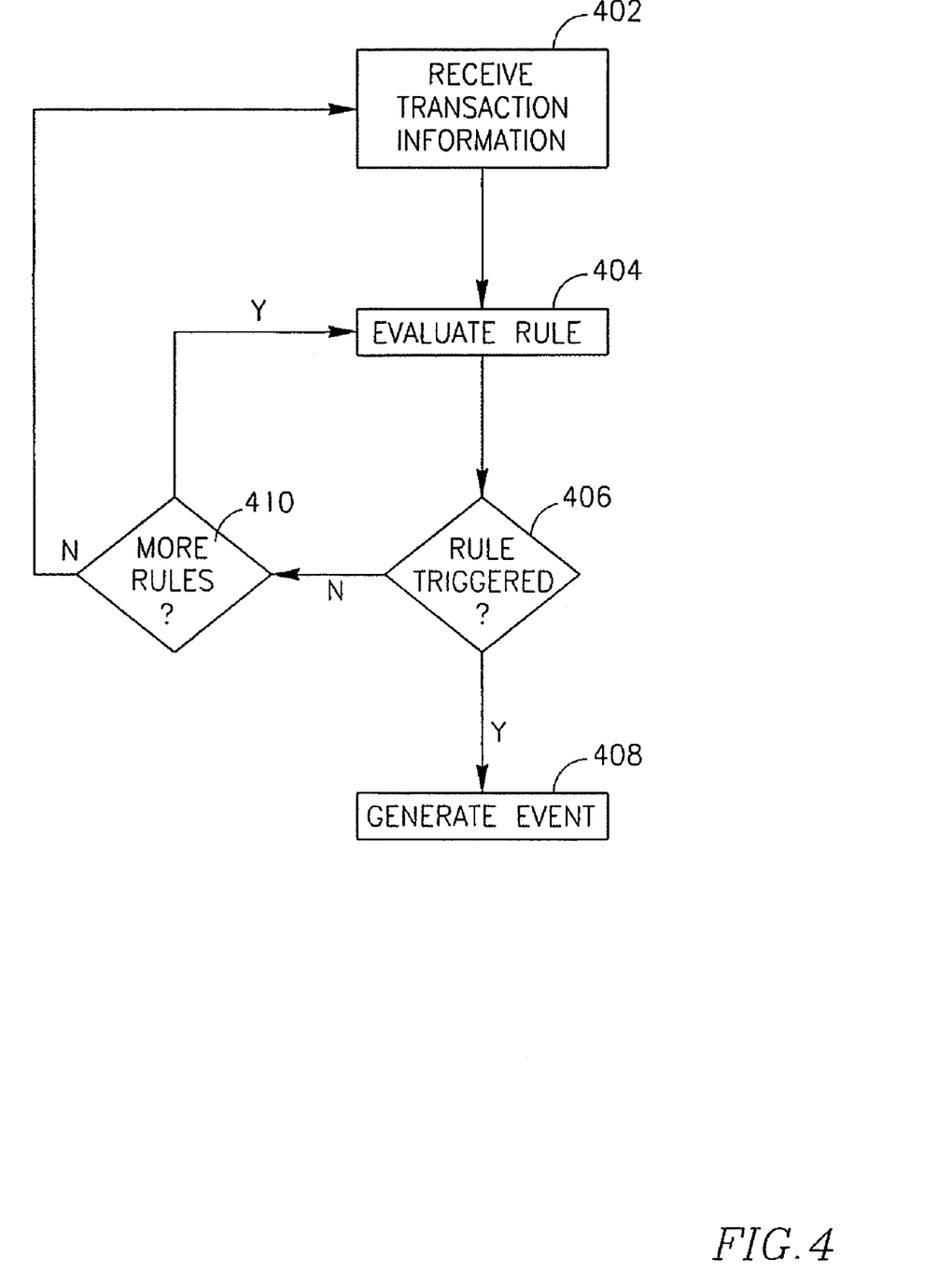
FIG. 4 schematically illustrates a flowchart of method of analyzing transaction information, in accordance with some demonstrative embodiments of the invention.

Reference is now made to FIG. 4, which schematically illustrates a method of analyzing transaction information, in accordance with some demonstrative embodiments of the invention. Although the invention is not limited in this respect, one or more operations of the method may be implemented by a profile module, e.g., profile module 238 and/or 240 (FIG. 2), to analyze transaction information, e.g., transaction information generated by memory access modules 230 and/or 232 (FIG. 2), respectively.

As indicated at block 402, the method may include receiving the transaction information. For example, profile modules 238 and/or 240 (FIG. 2) may receive, e.g., from queues 234 and/or 236 (FIG. 2), respectively, transactional information generated by memory access modules 230 and/or 232, (FIG. 2), respectively.

As indicated at block 404, the method may also include evaluating a detection rule based on the transaction information. For example, profile module 238 may evaluate a detection rule of a detection profile corresponding to SGA 202 (FIG. 2) based on the transaction information, as described above.

As indicated at block 406, the method may include determining whether the rule is triggered based on the transaction information. As indicated at block 408, the method may include generating an event, for example, if the rule is triggered.

As indicated at block 410, the method may include determining if the detection profile includes at least one additional detection rule to be evaluated if, for example, the detection rule is not triggered. The method may include evaluating the additional rule and/or determining whether the additional rule is triggered. The method may include receiving other transaction information, e.g., if no additional detection rule is to be evaluated.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for detecting an intrusion to a database, the method comprising:
providing a detection profile corresponding to said database;
deriving one or more structure maps of operating memory associated with said database, said structure maps including one or more parameters defining how said database uses said operating memory;
when a transaction with said database occurs, using at least one structure map of said structure maps to retrieve information about the transaction from the memory; and
analyzing said transaction information to generate an event corresponding to a suspicious transaction based on said detection profile.

2. The method according to claim 1, wherein the memory comprises a System Global Area (SGA) and wherein the transaction information is retrieved from the SGA.

3. The method according to claim 1, wherein the transaction information is retrieved at a pre-determined scanning rate.

4. The method according to claim 3, further comprising increasing the scanning rate responsive to the generation of the event.

5. The method according to claim 1, further comprising terminating a session associated with the transaction information following the generation of the event.

6. The method according to claim 1, further comprising queuing the transaction information retrieved from the memory.

7. The method according to claim 1, further comprising receiving an update to the detection profile from a server.

8. The method according to claim 1, further comprising communicating the event to a server.

9. The method according to claim 1, further comprising determining at least one operating system parameter relating to at least one of processor utilization and memory consumption.

10. The method according to claim 1, further comprising maintaining a log of one or more generated events.

11. The method according to claim 1, wherein said transaction information is retrieved directly from said memory using said at least one derived structure map without detecting and/or computing said one or more parameters.

12. The method according to claim 1, wherein said database has a transaction rate of at least ten transactions per second.

13. The method according to claim 1, wherein retrieving the transaction information from the memory associated with the database does not affect operation of the database.

14. The method according to claim 1, wherein there is an intrusion-detection-efficiency of at least six.

15. The method according to claim 1, further comprising generating at least one alert based on said event.

16. The method according to claim 1, wherein said parameters of said structure map defines one or more of a session area, a previous statement, a current statement, and dependencies.

17. A database intrusion detection sensor comprising:
a memory access module adapted to retrieve transaction information from an operating memory associated with the database using at least one derived memory structure map, said structure map defining one or more parameters of said operating memory; and
a profile module adapted to analyze said transaction information to generate an event based on a detection profile.

18. The database intrusion detection sensor according to claim 17, wherein said memory comprises a System Global Area (SGA) and wherein said transaction information is retrieved from said SGA.

19. The database intrusion detection sensor according to claim 17, wherein said memory access module is further adapted to retrieve said transaction information at a predetermined scanning rate.

20. The database intrusion detection sensor according to claim 19, wherein said profile module is further adapted to increase said scanning rate responsive to the generation of said event.

21. The database intrusion detection sensor according to claim 17, wherein said memory access module is further adapted to terminate a session associated with said transaction information if said transaction information triggers a detection rule.

22. The database intrusion detection sensor according to claim 17, further comprising a transaction queue adapted to queue said transaction information retrieved from said memory.

23. The database intrusion detection sensor according to claim 17, wherein said profile module is further adapted to receive an update to said detection profile.

24. The database intrusion detection sensor according to claim 17, further comprising a communication module adapted to communicate said event to a server.

25. The database intrusion detection sensor according to claim 17, further comprising an operating system data collector adapted to determine at least one operating system parameter relating to at least one of processor utilization by said database intrusion detection sensor and memory consumption by said database intrusion detection sensor.

26. The database intrusion detection sensor according to claim 17, further comprising a log module adapted to maintain a log of one or more events generated by said profile module.

27. A database system comprising:
a database host comprising a database and an operating memory associated with said database;
an intrusion detection sensor installed on said database host, wherein said intrusion detection sensor is adapted to retrieve transaction information from said memory using at least one derived memory structure map and to generate an event based on a detection profile, said structure map defining one or more parameters of said memory; and
a server adapted to communicate with said intrusion detection sensor.

28. The database system according to claim 27, wherein said server is further adapted to provide said intrusion detection sensor with an update to said detection profile.

29. The database system according to claim 27, wherein said intrusion detection sensor is further adapted to communicate said event to said server, and wherein said server is further adapted to generate an alert corresponding to said event and to transmit said alert to a recipient.

30. The database system according to claim 27, wherein said server comprises a management application adapted to enable a user to manage one or more members of a group consisting of: said intrusion detection sensor, said event, said detection profile and said server.

* * * * *